(12) United States Patent
Fischer et al.

(10) Patent No.: US 12,153,728 B2
(45) Date of Patent: Nov. 26, 2024

(54) OPTICAL SYSTEM FOR A VIRTUAL RETINA DISPLAY AND A GESTURE DETECTION OF A USER OF THE VIRTUAL RETINA DISPLAY

(71) Applicant: Robert Bosch GmbH, Stuttgart (DE)

(72) Inventors: Johannes Fischer, Pliezhausen (DE); Johannes Meyer, Haseluenne (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/506,952

(22) Filed: Nov. 10, 2023

(65) Prior Publication Data

US 2024/0219999 A1 Jul. 4, 2024

(30) Foreign Application Priority Data

Jan. 3, 2023 (DE) ...................... 10 2023 200 051.2

(51) Int. Cl.
*G09G 5/00* (2006.01)
*G02B 27/01* (2006.01)
*G06F 3/01* (2006.01)
*G06V 40/20* (2022.01)

(52) U.S. Cl.
CPC .......... *G06F 3/011* (2013.01); *G02B 27/0172* (2013.01); *G06V 40/20* (2022.01); *G02B 2027/0178* (2013.01)

(58) Field of Classification Search
CPC .......... G06F 3/011; G06F 3/013; G06F 3/017; G02B 27/0172; G02B 2027/0178; G02B 2027/0187; G02B 27/0093; G06V 40/20

USPC ............................................ 345/156, 173, 8
See application file for complete search history.

(56) References Cited

U.S. PATENT DOCUMENTS

| | | |
|---|---|---|
| 2015/0177831 A1 | 6/2015 | Chan et al. |
| 2015/0199006 A1* | 7/2015 | He .................. A61B 3/113 345/158 |
| 2015/0338651 A1 | 11/2015 | Wang et al. |
| 2021/0137634 A1 | 5/2021 | Lang |
| 2021/0231973 A1* | 7/2021 | Macnamara ............. A61B 3/00 |
| 2022/0043511 A1* | 2/2022 | Popovich ........... G02B 27/0172 |
| 2023/0333410 A1* | 10/2023 | Macnamara ............ G06T 13/40 |
| 2023/0359045 A1* | 11/2023 | Samec ................... A61B 3/085 |
| 2024/0248314 A1* | 7/2024 | Martin ............... G02B 27/0172 |

* cited by examiner

*Primary Examiner* — Thuy N Pardo
(74) *Attorney, Agent, or Firm* — NORTON ROSE FULBRIGHT US LLP; Gerard A. Messina (57) ABSTRACT

An optical system for a virtual retina display and a gesture detection of a user of the virtual retina display. The optical system includes a projector unit, an image source, and an image processing unit. The projector unit includes a first, second, and a third light source, and a first controllable deflection unit for scanning deflection of first, second, and third light beams. The optical system further includes a second deflection unit designed to transmit the first and second scanned light beams and to deflect the third light beam into a gesture detection area of the user. The optical system further includes a deflection unit, onto which the image content is projectable and which is configured to direct the projected image content and the second light beam onto an eye of a user.

15 Claims, 5 Drawing Sheets

OPTICAL SYSTEM FOR A VIRTUAL RETINA DISPLAY AND A GESTURE DETECTION OF A USER OF THE VIRTUAL RETINA DISPLAY

CROSS REFERENCE

The present application claims the benefit under 35 U.S.C. § 119 of German Patent Application No. DE 10 2023 200 051.2 filed on Jan. 3, 2023, which is expressly incorporated herein by reference in its entirety.

FIELD

The present invention relates to an optical system for a virtual retina display and a gesture detection of a user of the virtual retina display. The present invention further relates to a method for projecting image content onto the retina of a user of a virtual retina display and for gesture detection of a user of the virtual retina display by means of an optical system.

BACKGROUND INFORMATION

U.S. Patent Application Publication No. US 2021/137634 A1 describes a head-mounted display, which can be used in particular during the performance of medical operations. In this context, 3D scanning can be used to detect for example the hands of a surgeon and thus to perform further steps based on gesture recognition.

SUMMARY

An object of the present invention is to provide an optical system for a virtual retinal display and a gesture detection of a user of the virtual retinal display, which additionally takes into account an eye state of the user when projecting the image on the basis of a gesture of the user.

According to the present invention, an optical system for a virtual retina display and a gesture detection of a user of the virtual retina display are provided. Additionally provided according to the present invention is a method for projecting image content onto the retina of a user of a virtual retina display and for gesture detection of a user of the virtual retina display using an optical system.

According to an example embodiment of the present invention, the optical system for a virtual retina display and a gesture detection of a user of the virtual retina display comprises at least one image source that provides an image content in the form of image data, and an image processing unit for the image data. The optical system further comprises a projector unit having a time-modulable first light source for generating at least one first light beam. The first light beam is in particular a light beam visible to the user. In particular, it is a beam of light in a red, blue, or green wavelength range. The optical system further comprises a first controllable deflection unit for the at least one first light beam for scanning projection of the image content. The controllable deflection device is in particular at least one micromirror which is mounted rotatably about a first axis of rotation and about a second axis of rotation oriented essentially perpendicular to the first axis of rotation. In particular, the projection is two-dimensional. The optical system further comprises a second light source for generating at least a second light beam in a first infrared wavelength range. In this context, the first controllable deflection unit is designed to deflect the at least one second light beam in a scanning manner. Alternatively or additionally, the optical system comprises a third light source for generating at least one third light beam in a second infrared wavelength range different from the first infrared wavelength range. In this context, the first controllable deflection unit is also designed to deflect the at least one third light beam in a scanning manner. The optical system further comprises a second, in particular fixed, deflection unit, which is designed to transmit the first scanned light beam and at least a first portion of the second scanned light beam. Further, the second deflection unit is used to deflect a second portion of the second scanned light beam into a gesture detection area of the user of the virtual retina display. Alternatively, the second deflection unit is used to deflect the third light beam into the gesture detection area of the user of the virtual retina display. In this case, the second light beam is completely transmitted by the second deflection unit. The optical system also comprises a deflection unit, onto which the image content is projectable and which is configured to direct the projected image content and at least the first portion of the second light beam onto an eye of a user. In the case where the third light beam is directed into the gesture detection area by means of the second deflection unit, the second light beam is completely deflected onto the user's eye by means of the deflection unit. In particular, the deflection unit is a holographic optical element or an optical fiber. The optical system further comprises a first sensor designed to detect at least a backscattered at least first portion of the second light beam from an external ocular surface, in particular the iris or sclera, of the user or a modulation of a power, in particular a laser power, of the second light source. The optical system also comprises a second sensor designed to detect at least a second portion of the second light beam backscattered from a body part, in particular a hand, of the user arranged within the gesture detection area of the user of the virtual retina display or a modulation of a power, in particular a laser power, of the second light source. Alternatively, the second sensor is used to detect at least one backscattered third light beam or a modulation of a power, in particular a laser power, of the third light source. The optical system further comprises a computing unit which is designed to determine a pupil position of the user of the virtual retina display on the basis of the backscattered at least first portion of the second light beam detected by means of the first sensor or the modulation of the power of the second light source. Furthermore, the computing unit is designed to ascertain a gesture of the user of the virtual retina display on the basis of the backscattered second portion of the second light beam detected by means of the second sensor or the modulation of the power of the second light source. Alternatively, the computing unit is used to ascertain a gesture of the user of the virtual retina display on the basis of the backscattered third light beam detected by means of the second sensor or the modulation of the power of the third light source. Furthermore, the computing unit is used to control the image source for generating image data on the basis of the ascertained pupil position and the ascertained gesture of the user of the virtual retina display. For example, the user can indicate a change of the currently projected image to a new, subsequent image by a hand gesture. The detected pupil position of the user makes it possible to optimally adjust the projected image to the current pupil position of the user or to fade in the projected image into the current eyebox of the user.

Preferably, according to an example embodiment of the present invention, the at least one light beam, which is deflected by means of the second deflection unit in the direction of the gesture detection area, features a wavelength range between 940 nm and 1440 nm. In particular, this at least one light beam is the second portion of the second light beam, or alternatively the third light beam. In particular, the at least one light beam which is deflected by means of the second deflection unit in the direction of the gesture detection area features a wavelength range of substantially 1440 nm. As a result, there is less interference in the optical system, especially the gesture detection area, by the ambient light, especially the sun, since there is a gap in the spectrum of sunlight at 1440 nm.

Preferably, according to an example embodiment of the present invention, the optical system additionally comprises a beam combining unit, which is arranged in an area between the light sources and the first deflection unit. The beam combining unit is designed to combine the first and second light beams into a common light beam. Alternatively, the beam combining unit is designed to combine the first, second, and third light beams into a common light beam.

Preferably, according to an example embodiment of the present invention, the second deflection unit is designed as a wavelength-selective mirror, prism, or diffractive element, in particular as a holographic optical element. This results in the option of transmitting light rays in a certain wavelength range and reflecting light rays in another wavelength range. Preferably, the second deflection unit is additionally designed for beam splitting of the at least one second light beam, in particular into the first and second portion of the second light beam.

Preferably, according to an example embodiment of the present invention, the optical system also comprises a further optical element, which is designed in particular as a glass window, as a diffractive optical element, or as a further diffractive element. The further optical element is used to shape, in particular to widen, the gesture detection area. The gesture detection area, in particular the size of the gesture detection area, can therefore be adapted to the part of the user's body that is to be detected in the gesture detection area.

The second and/or third light source is preferably designed as a time-modulable and/or amplitude-modulable light source. As a result, it is possible to better distinguish between the light beams detected by the first and/or second sensor.

Preferably, according to an example embodiment of the present invention, the first and/or second sensors are photodiodes, SPAT diodes, or SPAT arrays. Alternatively, the second light source is preferably designed together with the first sensor and/or the second sensor as a first scanning laser feedback interferometry sensor. In this case, the first sensor can also correspond to the second sensor. Alternatively or additionally, the third light source, along with the second sensor, is designed as a second scanning laser feedback interferometry sensor.

The gesture detection area is preferably three-dimensional, in particular in the form of a light cone. The user's body part, in particular the hand, can be arranged within this light cone for detection by means of the second sensor and need not be in a fixed position for this purpose. However, the detection as such only takes place in a two-dimensional plane, in particular one that can be shifted in the direction of the opening of the light cone. In particular, this plane is located within the light cone and is built up by the respective scanned light beam.

Preferably, according to an example embodiment of the present invention, the computing unit, in particular for gesture ascertainment, is designed to generate an image, in particular a two-dimensional image, of the gesture of the user of the virtual retina display on the basis of the backscattered second portion of the second light beam detected by means of the second sensor or of the modulation of the power of the second light source. Alternatively, the computing unit is designed to generate the, in particular two-dimensional, image of the gesture of the user of the virtual retina display on the basis of the backscattered third light beam detected by means of the second sensor or of the modulation of the power of the third light source. Based on such an image, a gesture of the user can be determined as easily and flawlessly as possible.

The optical system is preferably designed as a pair of data glasses. In this context, the data glasses comprise at least one eyeglass temple. In this context, the further optical element, which is designed for shaping, in particular widening, the gesture detection area, additionally serves for coupling out the second portion of the at least one second light beam or the at least one third light beam from the eyeglass temple. The further optical element is in this case preferably arranged on an outer side of the eyeglass temple or integrated into the outer side of the eyeglass temple. Preferably, the first and/or second sensor is integrated into an eyeglass frame, into the at least one eyeglass temple or into a nose plate, in particular a nose pad, of the data glasses.

Another object of the present invention is to provide a method for projecting image content onto the retina of a user of a virtual retina display and for gesture detection of a user of the virtual retina display using an optical system. In particular, the optical system is the optical system described hereinabove. According to an example embodiment of the present invention, the optical system in this case comprises at least one image source that provides image content in the form of image data and one image processing unit for the image data. The optical system further comprises a projector unit having a time-modulable first light source for generating at least one first light beam and a first controllable deflection unit for the at least one first light beam for scanning projection of the image content. The optical system further comprises a second light source for generating at least one second light beam in a first infrared wavelength range, the first controllable deflection unit being designed to deflect in a scanning manner the at least one second light beam. Alternatively or additionally, the optical system comprises a third light source for generating at least a third light beam in a second infrared wavelength range different from the first infrared wavelength range. In this context, the first controllable deflection unit is designed to deflect the at least one third light beam in a scanning manner. The optical system additionally comprises a second, in particular fixed, deflection unit designed to transmit the first scanned light beam and at least a first portion of the second scanned light beam. Additionally, the second deflection unit is used to deflect a second portion of the second scanned light beam or the third light beam into a gesture detection area of the user of the virtual retina display. The optical system further comprises a deflection unit, onto which the image content is projectable and which is arranged to direct the projected image content and at least the first portion of the second light beam onto an eye of a user. The optical system additionally comprises a first sensor, a second sensor, and a computing unit. In the method, at least one first portion of the second light beam that is backscattered from an external ocular surface, in particular the iris or sclera, of the user, or a modulation of a power, in particular a laser power, of the second light source of the optical system, is first detected by means of the first sensor of the optical system. Furthermore, the at least one second portion of the second light beam backscattered from a body part, in particular a hand, of the user arranged within the gesture detection area of the user of the virtual retina display or a modulation of a power, in particular a laser power, of the second light source is detected. Alternatively, the at least one third light beam backscattered from the user's body part, in particular a hand arranged within the gesture detection area of the virtual retina display, or a modulation of a power, in particular a laser power, of the third light source is detected by means of the second sensor of the optical system. Furthermore, a pupil position of the user of the virtual retina display is determined on the basis of the backscattered at least first portion of the second light beam determined by means of the first sensor, or on the basis of the modulation of the power of the second light source by means of the computing unit of the optical system. Furthermore, a gesture of the user of the virtual retina display is ascertained on the basis of the backscattered second portion of the second light beam detected by means of the second sensor, or on the basis of the modulation of the power of the second light source. Alternatively, the gesture of the user of the virtual retina display is ascertained on the basis of the backscattered third light beam detected by means of the second sensor, or on the basis of the modulation of the power of the third light source by means of the computing unit of the optical system. The image source is then controlled on the basis of the ascertained pupil position and the ascertained gesture of the user of the virtual retina display.

DETAILED DESCRIPTION OF EXAMPLE EMBODIMENTS

Figure 1:
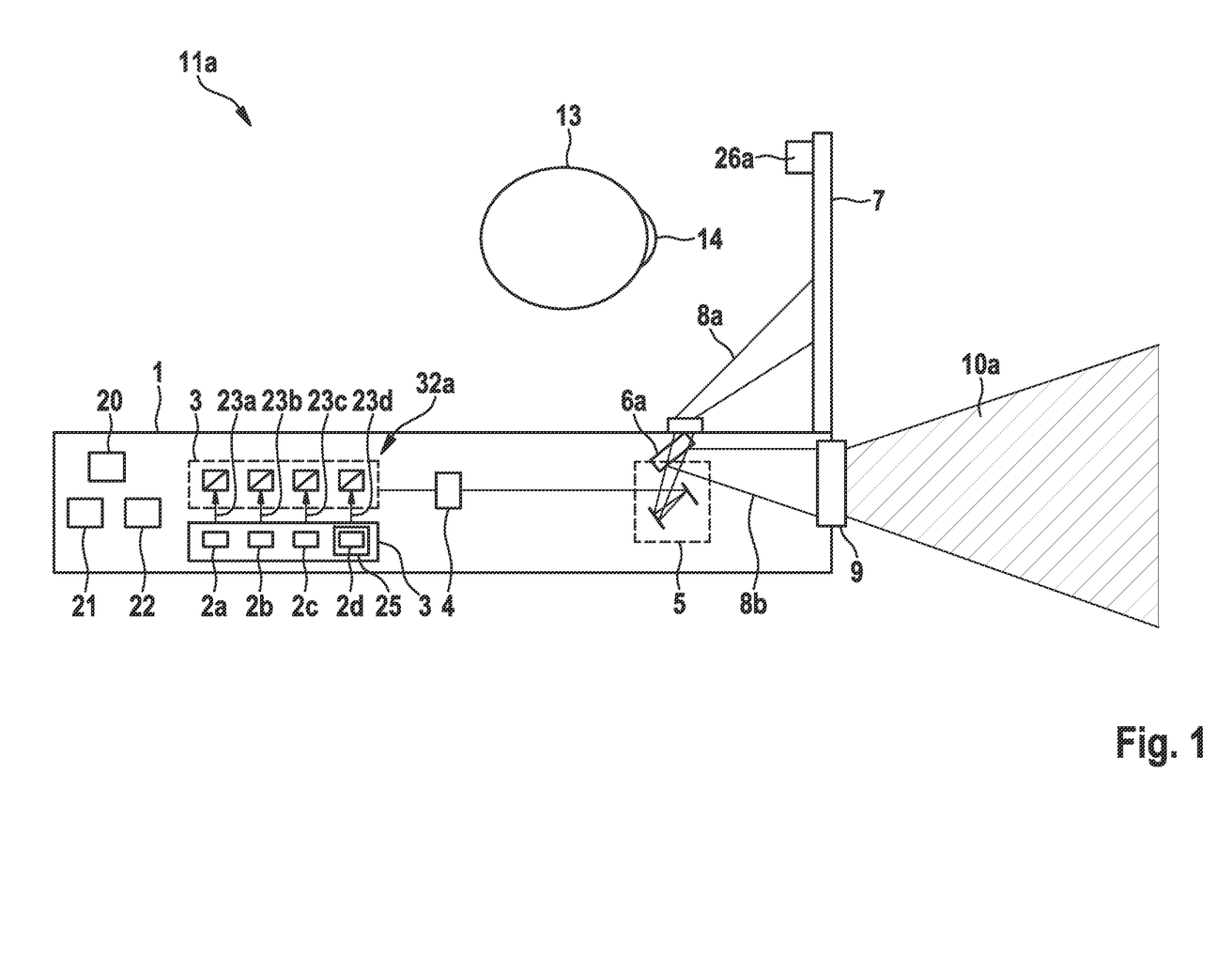
FIG. 1 shows a first embodiment of the optical system according to the present invention.

FIG. 1 schematically shows a first embodiment of an optical system 11a for a virtual retina display and for a gesture detection of a user of the virtual retina display. The optical system 11a, which in this case is designed as a pair of data glasses, comprises an image source 21 that provides image content in the form of image data. The optical system 11a further comprises an image processing unit 22 for the image data. Furthermore, the optical system 11a comprises a projector unit 32a having a time-modulable first light source 2a for generating at least a first light beam 23a. The projector unit 32a further comprises one first controllable deflection unit 5 for the at least one first light beam 23a for scanning projection of the image content. The projector unit 32a further compromises one second light source 2d for generating at least one second light beam 23d in a first infrared wavelength range. In this first embodiment, the second light beam 23d features a wavelength range of substantially 1440 nm. In this case, the second light source 2d is designed as a time-modulable light source. The first controllable deflection unit 5 is also designed in this context to deflect the at least one second light beam 23d in a scanning manner. The optical system 11a further comprises a second fixed deflection unit 6, which is designed to transmit the first scanned light beam 23a and at least one first portion 8a of the second scanned light beam 23d. The second deflection unit 6 is also used to deflect a second portion 8b of the second scanned light beam 23d into a gesture detection area 10 of the user of the virtual retina display. The optical system 11a further comprises a deflection unit 7, onto which the image content is projectable and which is configured to direct the projected image content and at least the first portion 8a of the second light beam 23d onto an eye 13 of a user. The optical system 11a further comprises a first sensor 26a, which is designed to detect at least one first portion 8a of the second light beam 23d backscattered from an external ocular surface, in particular the iris or sclera of the user. In this case, the first sensor 26a is designed as a photodiode. The optical system further comprises a second sensor 25, which is designed to detect a modulation of a power, in particular a laser power, of the second light source 2d. In this case, the second light source 2d, along with the second sensor 25, is designed as a first scanning laser feedback interferometry sensor. The optical system 11a further comprises a computing unit 20, which is designed to determine a position of a pupil 14 of the user of the virtual retina display on the basis of the backscattered at least the first portion 8a of the second light beam 23d detected by means of the first sensor 26a. Furthermore, the computing unit 20 is designed to ascertain a gesture of the user of the virtual retina display on the basis of the modulation of the power of the second light source 2d detected by means of the second sensor 25. Furthermore, the computing unit 20 is used to control the 21 image source to generate image data on the basis of the ascertained pupil position and the ascertained gesture of the user of the virtual retina display. The user's particular gesture can thus, e.g., indicate a change from the currently projected image to a subsequent image. The ascertained pupil position enables the projected image to be projected onto the current pupil position or into the current eyebox of the user of the virtual retina display.

In this first embodiment, the optical system 11a further comprises a fourth light source 2b and a fifth light source 2c. The first light source is designed to emit the first light beam 23a in a red wavelength range. The fourth light source 2b is used to emit a fourth light beam 23b in a green wavelength range. The fifth light source 2c is used to emit a fifth light beam 23c in a blue wavelength range. The optical system 11a further comprises a beam combining unit 4, which is arranged in an area between the light sources 2a, 2b, 2c, and 2d and the first deflection unit 5 and is designed to combine the first light beam 23a, the second light beam 23d, the fourth light beam 23b, and the fifth light beam 23c into a common light beam.

In this first embodiment, the second deflection unit 6a is additionally designed to split the beam of the at least one second light beam 23d into the first portion 8a of the second light beam 23d and the second portion of the second light beam 23d. In this embodiment, the second deflection unit 6a is a prism.

The optical system 11a also comprises another optical element 9 that is designed to expand the gesture detection area 10a. The further optical element 9 is designed as a diffractive optical element.

The optical system 11a, in the form of data glasses, comprises a eyeglass temple 1, into which the projector unit 32a is integrated and on the outside of which the further optical element 9 is arranged. In this case, the further optical element 9 is additionally used to couple out the second portion 8b of the at least one second light beam 23d from the eyeglass temple 1 in the direction of the gesture detection area 10a. The optical system 11a further comprises an optical window 30, which is used to couple the first light beam 23a and the second portion 8b of the second light beam 23d out of the eyeglass temple 1 towards the deflection unit 7.

The optical system 11a also comprises a plurality of collimating lenses which are used to compensate for the divergence of respective light beams 23a, 23b, 23c, and 23d.

Figure 2:
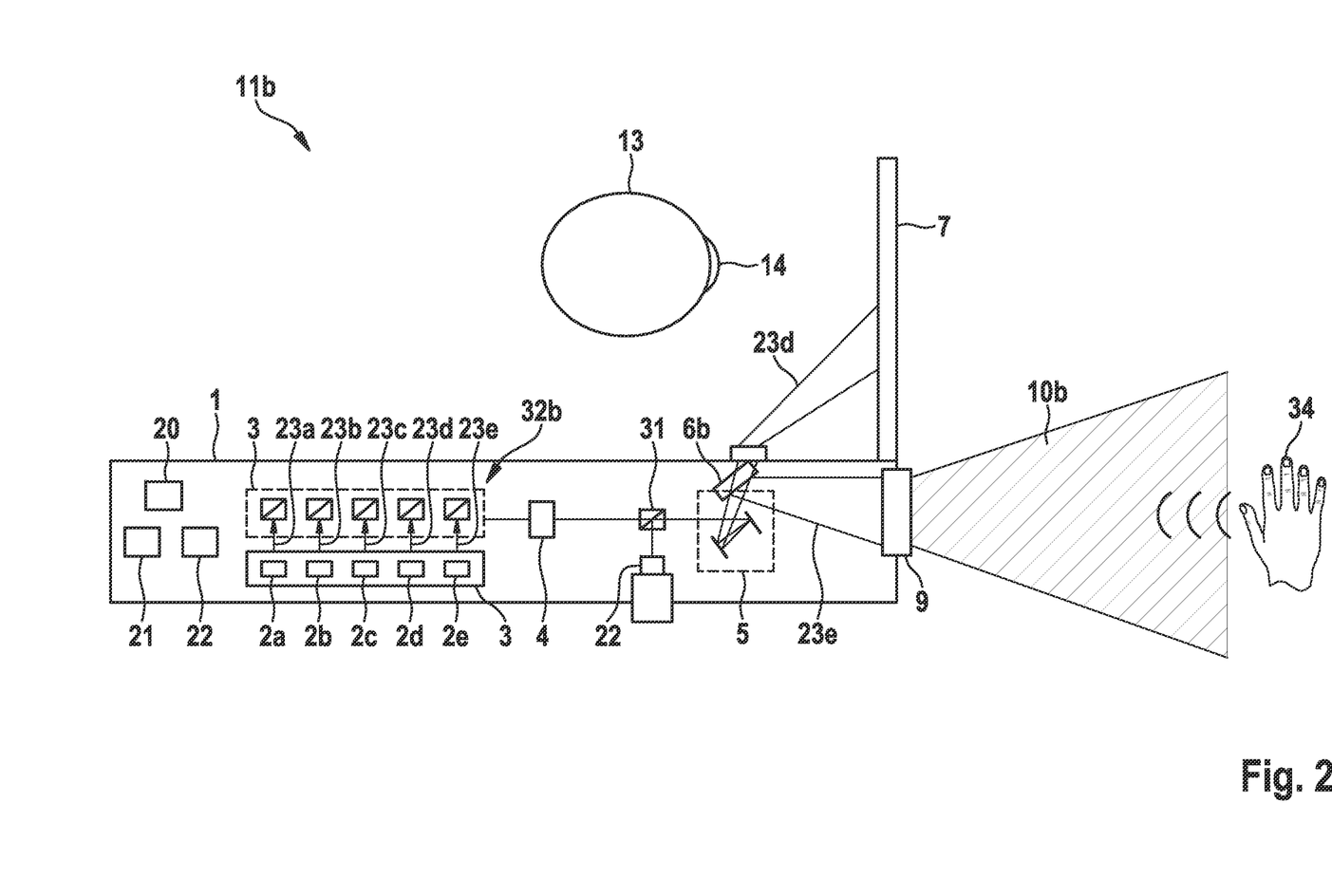
FIG. 2 shows a second embodiment of the optical system according to the present invention.
Figure 4:
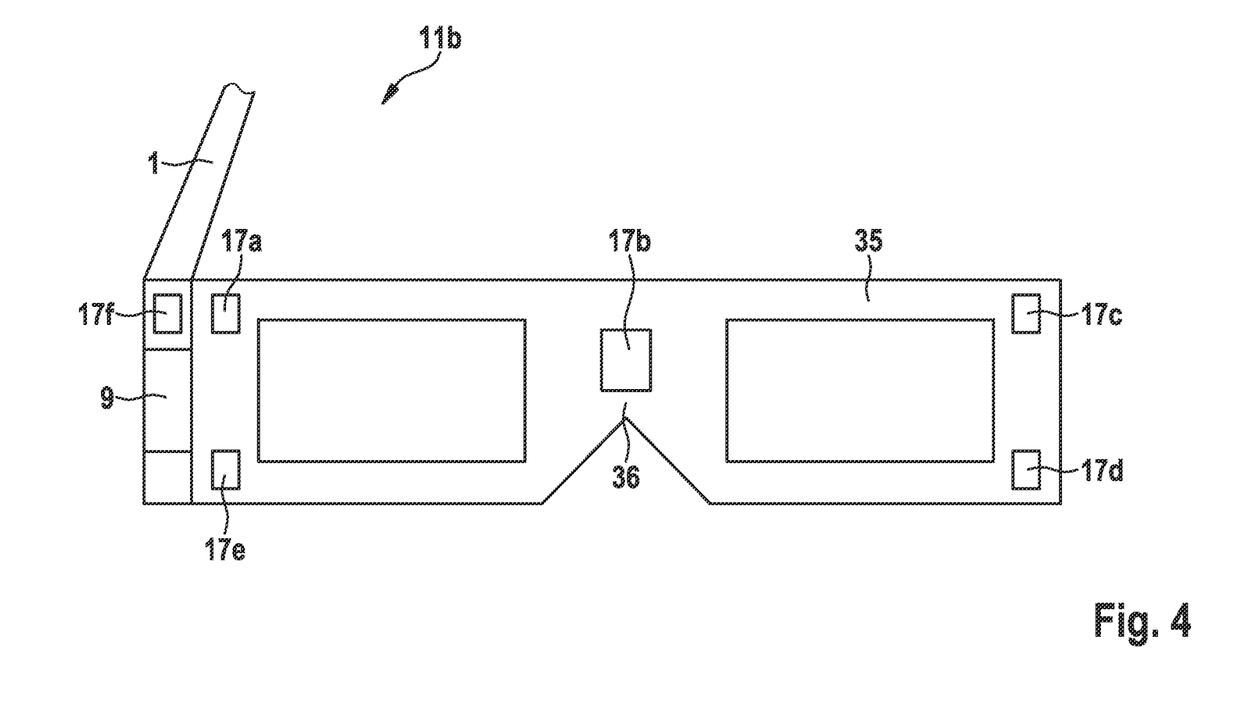
FIG. 4 shows possible arrangements of the second sensor, according to an example embodiment of the present invention.

FIG. 2 schematically shows a second embodiment of an optical system 11b for a virtual retina display and for a gesture detection of a user of the virtual retina display. In contrast to the first embodiment, the optical system 11b additionally comprises a third light source 2e, which is designed to emit at least a third light beam 23e in a second infrared wavelength range, which is different from the first infrared wavelength range. The first controllable deflection unit 5 is designed to deflect the at least one third light beam 23e in a scanning manner. In this second embodiment, the second light source 2d is designed to emit the second light beam 23d in a first wavelength range of 1000 nm. The third light source 2e is again designed to emit the third light beam 23e in a second wavelength range of 1440 nm. The second deflection unit 6b, which in this case is designed as a wavelength-selective mirror, is used to transmit the first scanned light beam 23a and the second light beam 23d. Furthermore, the second deflection unit 6b is used to deflect the third light beam 23e into a gesture detection area 10b of the user of the virtual retina display. A second sensor (not shown on this drawing for the sake of simplicity) is designed to detect at least a third light beam 23e backscattered from a hand 34 arranged within the gesture detection area 10b of the user of the virtual retina display as a body part. In this context, FIG. 4 shows possible arrangements of photodiodes as a second sensor 17a to 17f in an eyeglass frame 35, in the eyeglass temple 1, or in a nose plate 26 of the data glasses. The computing unit 20 is used to determine a pupil position of the user of the virtual retina display on the basis of the modulation of the power of the second light source 2d detected by means of the first sensor 32. Furthermore, the computing unit 20 is used to ascertain a gesture of the user of the virtual retina display on the basis of the backscattered third light beam 23e detected by means of the second sensor. In addition, the computing unit 20 is used to control the image source 21 to generate image data on the basis of the ascertained pupil position and the ascertained gesture of the user of the virtual retina display.

In this embodiment, the first sensor 32 is designed as a first scanning laser feedback interferometry sensor 32 and is arranged outside the projector unit 32b. In this regard, the optical system 11b comprises a dichroic mirror 31 in order to redirect the second light beam 23d toward the first sensor 32.

Figure 3A:
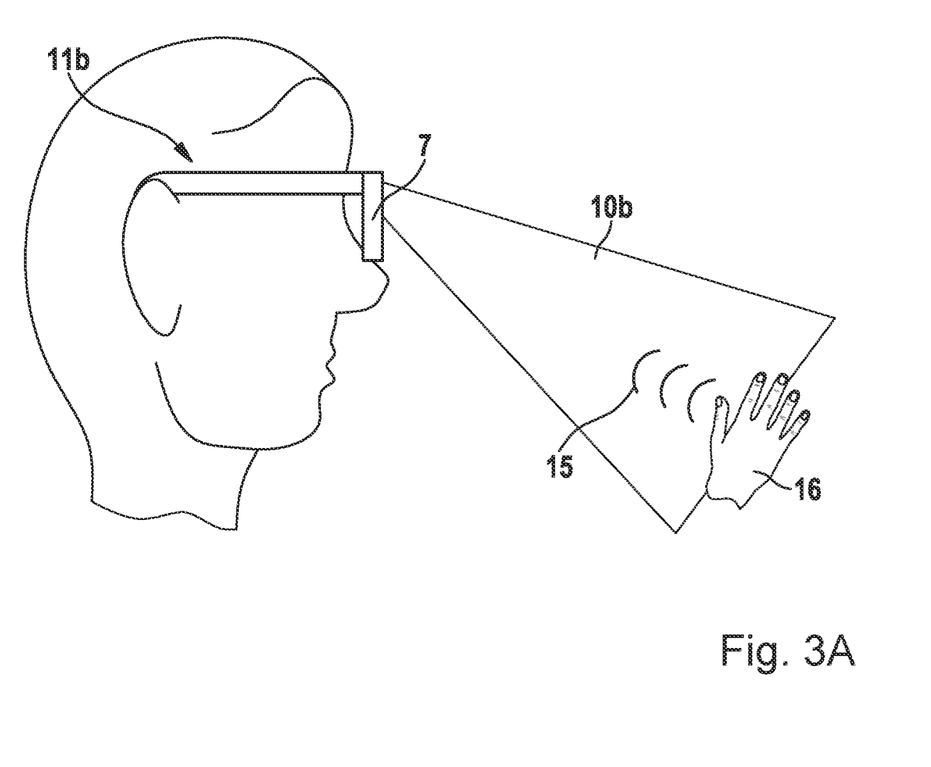
FIG. 3A shows a user's hand in the gesture detection area in a first view.
Figure 3B:
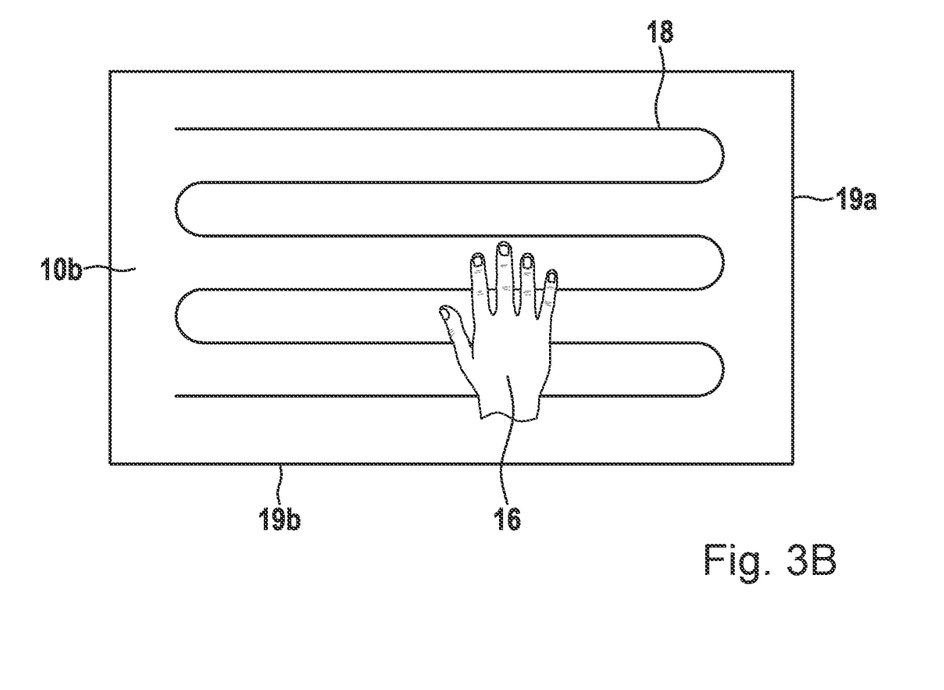
FIG. 3B shows the user's hand in the gesture detection area in a second view.

FIG. 3A again shows the gesture detection area 10b, within which a hand 16 of the user is located. Third light rays are scattered back by this hand 16 and then detected by means of a second sensor. As can be seen in FIGS. 3A and 3B, the gesture detection area 10b is three-dimensional, in the form of a light cone. However, as can be seen in FIG. 3B, the detection of the hand 16 is itself performed in a two-dimensional plane, which is spanned by the rectangle with edges 19a and 19b and is located within the light cone. Within this rectangle, the third light beam is scanned in lines. In turn, in connection with the gesture ascertainment, the computing unit 20 is designed to generate a two-dimensional image of the gesture of the user of the virtual retina display on the basis of the 15 third light beam backscattered by means of the second sensor.

Figure 5:
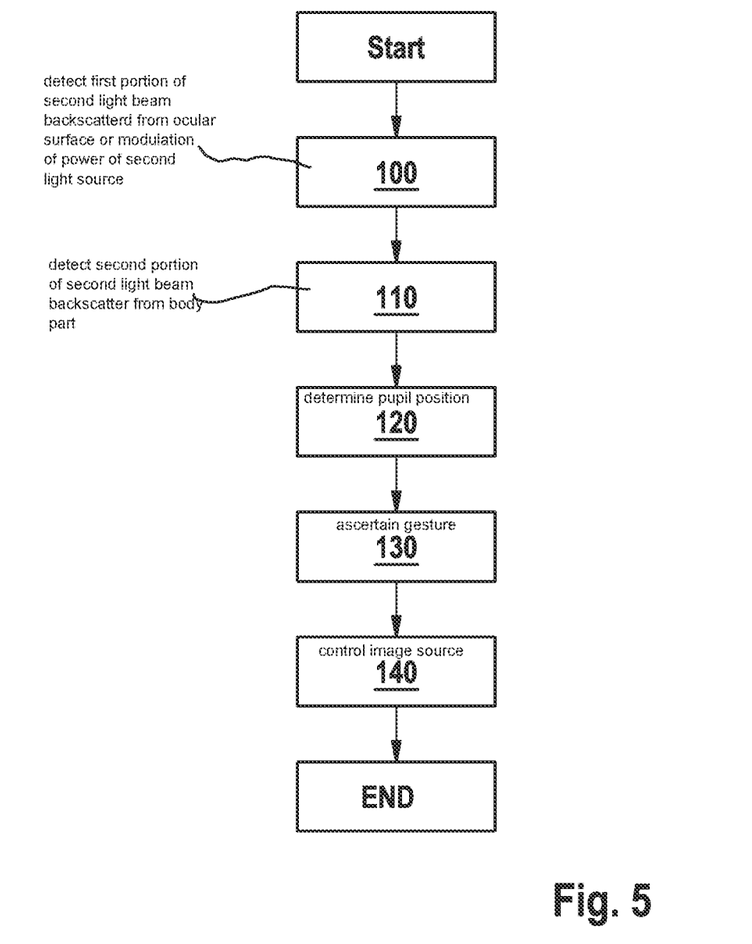
FIG. 5 shows a method for projecting image content onto the retina of a user of a virtual retina display and for gesture detection of a user of the virtual retina display using an optical system, according to an example embodiment of the present invention.

FIG. 5 shows a method for projecting image content onto the retina of a user of a virtual retina display and for gesture detection of a user of the virtual retina display using an optical system in the form of a flowchart. The optical system is in particular an optical system, as shown by way of example in FIGS. 1 and 2. The optical system in this case comprises at least one image source, which provides image content in the form of image data, and an image processing unit for the image data. The optical system further comprises a projector unit having a time-modulable first light source for generating at least one first light beam, and a first controllable deflection unit for the at least one first light beam for scanning projection of the image content. The optical system further comprises a second light source for generating at least one second light beam in a first infrared wavelength range, the first controllable deflection unit being designed to deflect the at least one second light beam in a scanning manner. Alternatively or additionally, the optical system comprises a third light source for generating at least a third light beam in a second infrared wavelength range different from the first. In this context, the first controllable deflection unit is designed to deflect the at least one third light beam in a scanning manner. The optical system also comprises a second, in particular fixed, deflection unit, which is designed to transmit the first scanned light beam and at least one first portion of the second scanned light beam. Additionally, the second deflection unit is used to deflect one second portion of the second scanned light beam or the third light beam into a gesture detection area of the user of the virtual retina display. The optical system also comprises a deflection unit, onto which the image content is projectable and which is configured to direct the projected image content and at least the first portion of the second light beam onto an eye of a user. The optical system also comprises a first sensor, a second sensor, and a computing unit. In the method, during method step 100, initially the at least first portion of the second light beam backscattered from an external ocular surface, in particular the iris or sclera of the user, or a modulation of a power, in particular a laser power, of the second light source of the optical system is detected by means of the first sensor of the optical system. In method step 110, which follows method step 100, the at least one second portion of the second light beam backscattered from a body part, in particular a hand, of the user arranged within the gesture detection area of the user of the virtual retina display or a modulation of a power, in particular a laser power, of the second light source is detected. Alternatively, in method step 110, the at least one backscattered third light beam or a modulation of a power, in particular a laser power, of the third light source is detected by means of the second sensor of the optical system. In method step 120, which follows method step 110, a pupil position of the user of the virtual retina display is determined on the basis of the backscattered at least first portion of the second light beam detected by means of the first sensor, or on the basis of the modulation of the power of the second light source by means of the computing unit of the optical system. In method step 130, which follows method step 120, a gesture of the user of the virtual retina display is ascertained on the basis of the backscattered second portion of the second light beam detected by means of the second sensor, or the modulation of the power of the second light source by means of the computing unit of the optical system. Alternatively, in method step 130, the gesture of the user of the virtual retina display is ascertained on the basis of the backscattered third light beam detected by means of the second sensor, or the modulation of the power of the third light source by means of the computing unit of the optical system. In method step 140, which follows method step 130, the image source is controlled on the basis of the ascertained pupil position and the ascertained gesture of the user of the virtual retina display. Thereafter, the method ends.

What is claimed is:

1. An optical system for a virtual retina display and a gesture detection of a user of the virtual retina display, comprising:
   a. an image source configured to provide image content in the form of image data;
   b. an image processing unit for the image data;
   c. a projector unit including:
      a time-modulable first light source configured to generate at least one first light beam,
      a first controllable deflection unit for the at least one first light beam to scan the image content,
      a second light source configured to generate at least one second light beam in a first infrared wavelength range, wherein the first controllable deflection unit is configured to deflect the at least one second light beam in a scanning manner,
      optionally a third light source configured to generate at least one third light beam in a second infrared wavelength range which is different from the first infrared wavelength range, wherein the first controllable deflection unit is configured to deflect the at least one third light beam in a scanning manner, and
      a second, fixed, deflection unit configured to transmit the first scanned light beam and at least one first portion of the second scanned light beam, and to deflect a second portion of the second scanned light beam or the third light beam into a gesture detection area of the user of the virtual retina display;
   d. a deflection unit, onto which the image content is projectable and which is configured to direct the projected image content and at least the first portion of the second light beam onto an eye of the user;
   e. a first sensor configured to detect at least one first portion of the second light beam backscattered from an external ocular surface including an iris or sclera of the user, or a modulation of a power of the second light source;
   f. a second sensor configured to detect at least one second portion of the second light beam backscattered from a body part including a hand of the user arranged within the gesture detection area of the user of the virtual retinal display, or a modulation of a power of the second light source, or at least one backscattered third light beam, or a modulation of a power the third light source; and
   g. a computing unit configured to: (i) ascertain a pupil position of the user of the virtual retina display based on the backscattered at least first portion of the second light beam detected using the first sensor, or the modulation of the power of the second light source, and (ii) based on the backscattered second portion of the second light beam or the modulation of the power of the second light source detected using the second sensor, or based on the backscattered third light beam detected using the second sensor, or the modulation of the power of the third light source, to ascertain a gesture of the user of the virtual retina display, and, based on the ascertained pupil position and the ascertained gesture of the user of the virtual retina display, to control the image source for generating image data.

2. The optical system according to claim 1, wherein the second portion of the second light beam or the third light beam, which is deflected using the second deflection unit in a direction of the gesture detection area, has a wavelength range between 940 nm and 1440 nm.

3. The optical system according to claim 1, wherein the optical system additionally comprises a beam combining unit, which is arranged in an area between the first, second, and third light sources and the first deflection unit, and is configured to combine the first, the second, and/or the third light beam into a common light beam.

4. The optical system according to claim 1, wherein the second deflection unit is a wavelength-selective mirror, or a prism, or a diffractive element, or a holographic optical element.

5. The optical system according to claim 4, wherein the second deflection unit is configured for beam splitting of the at least one second light beam into the first portion and second portion of the second light beam.

6. The optical system according to claim 1, wherein the optical system further comprises a further optical element including a glass window or a diffractive optical element or a further diffractive element, which is configured to widen the gesture detection area.

7. The optical system according to claim 1, wherein the second and/or third light source is a time-modulable and/or amplitude-modulable light source.

8. The optical system according to claim 1, wherein the first sensor and/or the second sensor, includes a photodiode, or SPAT diode, or SPAT array.

9. The optical system according to claim 1, wherein the second light source, along with the first sensor and/or the second sensor, is configured as a first scanning laser feedback interferometry sensor, and/or the third light source, along with the second sensor, is configured as a second scanning laser feedback interferometry sensor.

10. The optical system according to claim 1, wherein the gesture detection area is three-dimensional, in the form of a light cone.

11. The optical system according to claim 1, wherein the computing unit, for the ascertainment of the gesture, is configured to calculate, based on the backscattered second light beam detected using the second sensor, or the modulation of the power of the second light source, or based on the backscattered third light beam detected using the second sensor, or the modulation of the power of the third light source, to generate a two-dimensional image of the gesture of the user of the virtual retina display.

12. The optical system according to claim 1, wherein the optical system is a pair of data glasses.

13. The optical system according to claim 6, wherein the optical system is a pair of data glasses, and wherein the data glasses include at least one eyeglass temple, and the further optical element is additionally configured for coupling out the second portion of the at least one second light beam or the at least one third light beam from the eyeglass temple.

14. The optical system according to claim 13, wherein the first sensor and/or the second sensor is integrated into an eyeglass frame, or into the at least one eyeglass temple, or into a nose nose pad of the data glasses.

15. A method for projecting image content onto a retina of a user of a virtual retina display and gesture detection of a user of the virtual retina display using an optical system including:
   a. an image source configured to provide image content in the form of image data;
   b. an image processing unit for the image data;
   c. a projector unit including:
      a time-modulable first light source configured to generate at least one first light beam,
      a first controllable deflection unit for the at least one first light beam for the scanning projection of the image content,
      a second light source configured to generate at least one second light beam in a first infrared wavelength range, wherein the first controllable deflection unit is configured to deflect the at least one second light beam in a scanning manner,
      optionally a third light source configured to generate at least one third light beam in a second infrared wavelength range which is different from the first infrared wavelength range, wherein the first controllable deflection unit is configured to deflect the at least one third light beam in a scanning manner, and
      a second, fixed, deflection unit, configured to transmit the first scanned light beam and at least one first portion of the second scanned light beam, and to deflect one second portion of the second scanned light beam or the third light beam into a gesture detection area of the user of the virtual retina display;
   d. a deflection unit, onto which the image content is projectable and which is configured to direct the projected image content and at least the first portion of the second light beam onto an eye of the user;
   e. a first sensor and a second sensor; and
   f. a computing unit;
   wherein the method comprises the following steps:
      detecting, using the first sensor of the optical system, the at least first portion of the second light beam backscattered from an external ocular surface including an iris or sclera of the user, or a modulation of a power of the second light source of the optical system;
      detecting, using the second sensor of the optical system, the at least one second portion of the second light beam backscattered by a body part including a hand of the user arranged within the gesture detection area of the user of the virtual retina display, or a modulation of a power of the second light source, or at least one backscattered third light beam, or a modulation of a power of the third light source;
      ascertaining a pupil position of the user of the virtual retinal display based on the backscattered at least first portion of the second light beam detected using the first sensor, or the modulation of the power of the second light source, using the computing unit of the optical system; and
      ascertaining a gesture of the user of the virtual retina display based on the backscattered second portion of the second light beam detected using the second sensor, or the modulation of the power of the second light source, or based on the backscattered third light beam detected using the second sensor, or the modulation of the power of the third light source, using the computing unit of the optical system; and
      controlling the image source based on the ascertained pupil position and the ascertained gesture of the user of the virtual retina display.

* * * * *